United States Patent [19]
Lubbe

[11] Patent Number: 5,494,089
[45] Date of Patent: Feb. 27, 1996

[54] TENON AND MORTICE JIG FOR A ROUTER

[76] Inventor: Gerald W. Lubbe, 4 Berg Street, Klawer 8145, South Africa

[21] Appl. No.: 369,808

[22] Filed: Jan. 9, 1995

[30] Foreign Application Priority Data

Jan. 10, 1994 [ZA] South Africa .......................... 94/0119

[51] Int. Cl.⁶ ..................................................... B27M 3/00
[52] U.S. Cl. ...................... 144/144 R; 144/82; 144/84; 144/142; 144/371; 144/372; 144/134 R
[58] Field of Search .................................. 144/27, 82, 83, 144/84, 85, 87, 134 D, 136 C, 142, 144 R, 144.5 R, 144.5 GT, 371, 372, 134 R; 409/84, 89, 108, 128

[56] References Cited

U.S. PATENT DOCUMENTS

| 2,166,831 | 7/1939 | Wazad, Sr. | 144/84 |
| 4,355,557 | 10/1982 | Mecsey | 144/144 R |
| 4,593,735 | 6/1986 | Wirth, Jr. | 144/144 R |
| 4,749,013 | 6/1988 | Ducate, Sr. | 144/84 X |
| 4,909,292 | 3/1990 | Wirth, Jr. | 144/144 R |
| 5,123,463 | 6/1992 | Grisley | 144/84 X |
| 5,279,342 | 1/1994 | Drees | 144/144 R |

Primary Examiner—W. Donald Bray
Attorney, Agent, or Firm—Larson and Taylor

[57] ABSTRACT

A mortise and tenon jig for a router device includes a base structure; and a mounting member joined to the base structure, and being attachable to a support structure such as a table. It further includes first spaced apart parallel elongated guiding members; second spaced apart parallel elongated guiding members; a router support member for operatively supporting a router device; first sliding members attached to the second guiding members for slidingly supporting these relative to the first guiding members; and second sliding members slidingly mounted on the second guiding members. An attachment member is provided for attaching the router support member to the second sliding members. Clamping plates are slidably joined to the base structure. Stop means for limiting movement of the first and second sliding members are provided. Finally a tenon template support member is connected to the second sliding members; and a template guide member for moving along a tenon profile template is joined to the template support member.

5 Claims, 7 Drawing Sheets

TENON AND MORTICE JIG FOR A ROUTER

FIELD OF INVENTION

The present invention relates to a mortise and tenon jig for a router device.

BACKGROUND TO INVENTION

It generally is difficult for do-it-yourself wood workers to cut tenons and matching mortises accurately and rapidly. As a result of this problem various jigs and tool attachments for conventional routers have been suggested. A disadvantage of all of these devices is that they generally are complicated, difficult to handle and, inevitably, are expensive.

An object of the invention therefore is to suggest a tenon and mortise jig which is of simple construction, easy to handle and which should not be costly to manufacture as compared to the known devices.

SUMMARY OF INVENTION

According to the invention, a mortise and tenon jig for a router device includes
a) a base structure;
b) a mounting member joined to the base structure, and being attachable to a support structure such as a table;
c) first spaced apart parallel elongated guiding members attached to the base structure;
d) second spaced apart parallel elongated guiding members;
e) a router support member for operatively supporting a router device;
f) first sliding members attached at opposite ends of the second guiding members for slidingly supporting these relative to the first guiding members;
g) second sliding members slidingly mounted on the second guiding members;
h) an attachment member for attaching the router support member to the second sliding members;
i) a first work piece clamping plate slidably joined to the base structure;
j) a second work piece clamping plate slidably joined to the base structure;
k) moving means for moving the second work piece clamping plate relative to the first work piece clamping plate for clamping a work piece between them;
l) first stop means for limiting movement of the first sliding members on the first guiding members;
m) second stop means for limiting movement of the second sliding members on the second guiding members;
n) a tenon template support member connected to the second sliding members; and
o) a template guide member for moving along a tenon profile template joined to the template support member.

The first guiding members may be constituted by a pair of rods.

The second guiding members may be constituted by a pair of rods.

The router support member may include a plate having a hole for a router's cutter to pass through and being supported by bars joined to the second sliding members.

The tenon template support member may have adjusting means for adjustably attaching a tenon profile template to it.

BRIEF DESCRIPTION OF DRAWINGS

The invention will now be described by way of example with reference to the accompanying schematic drawings.

In the drawings there is shown in.

DETAILED DESCRIPTION OF DRAWINGS

The mortise and tenon jig, generally indicated by reference numeral 10 in the drawings, is intended to serve as an uncomplicated tool for assisting woodworkers, in particular do-it-yourself types or small industries, to cut mortises and tenons rapidly and accurately.

The router to be used is a plunger-type router allowing its cutter to be moved vertically in the z-axis.

Figure 10:
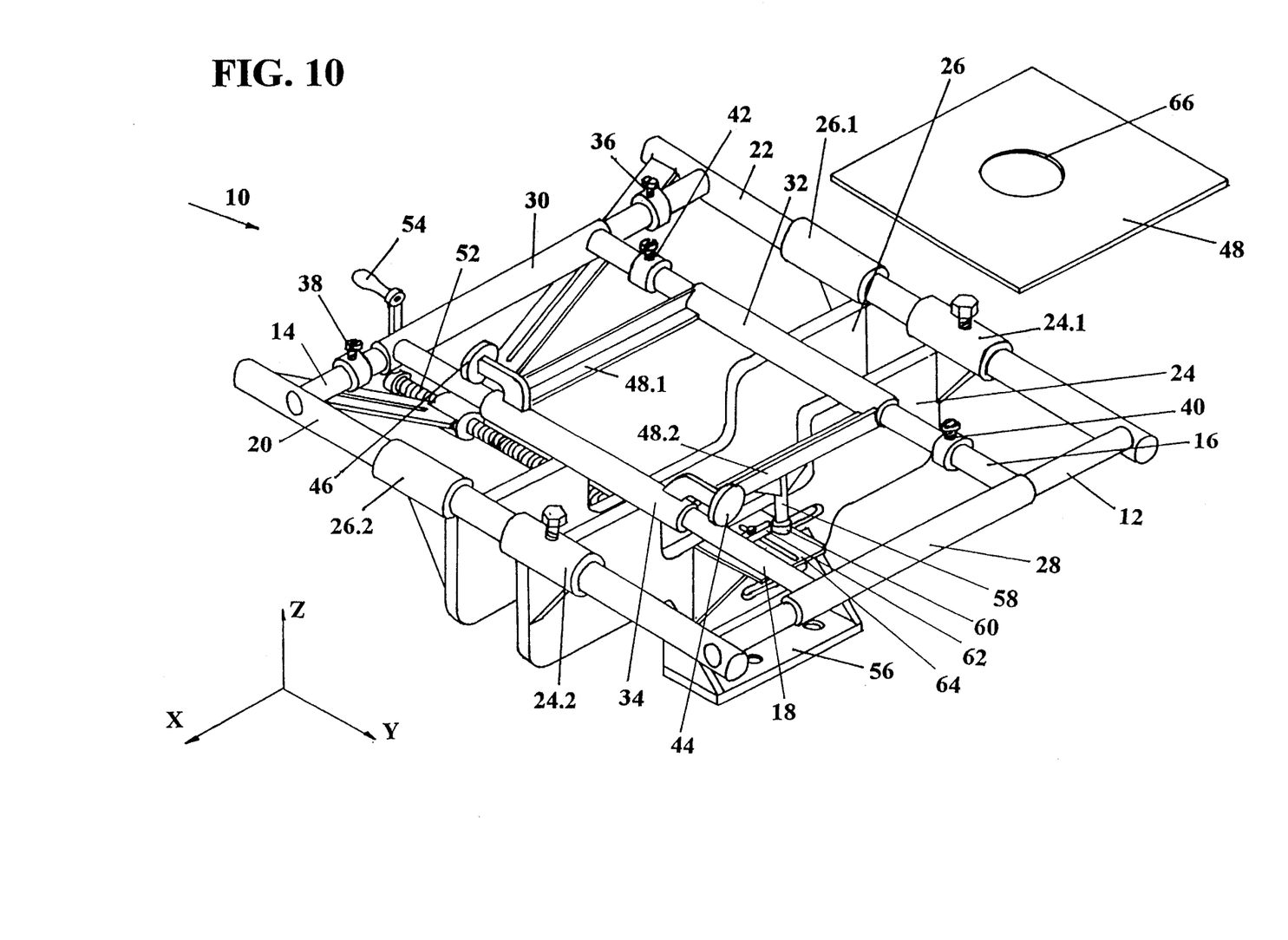
FIG. 10 a perspective view of the jig corresponding to FIG. 1 but with the router platform removed, and indicating the three movement axes, namely x-y-z-axes.

The jig 10 basically allows the router to move along an x-axis or a y-axis, as shown in FIG. 10, and the router itself can move vertically along a z-axis.

Referring to the drawings, the jig 10 includes first longitudinal guide rails 12, 14 for movement along the x-axis, and second transverse guide rails 16, 18 for movement along the y-axis.

The rails 12, 14, are joined to a base structure constituted by the clamping bars 20, 22.

Clamping plates 24, 26 for clamping a work piece between them are mounted by way of tubes 24.1, 24.2 and 26.1, 26.2 on the rails 20, 22. Both the tubes 26.1 26.2 and the tubes 24.1, 24.2 are slidable, but the tubes 24.1, 24.2 can be locked by way of their locking bolts on the rails 20, 22.

The rails 16, 18 are slidably supported along the x-axis by way of longitudinal sliding tubes 28, 30.

The rails 16, 18 slidably support the transverse sliding tubes 32, 34.

Tubular locking collars 36, 38, 40, 42 are provided on the rails 12, 14, 16, 18 as shown to limited movements as explained below.

The tube 34 cooperates with thumb grips 44, 46 to facilitate movement of the router carriage plate 48 in the y-axis, the plate 48 being fixed to the sliding tubes 32, 34 by way of bars 48.1, 48.2. The plate 48 is adapted to carry a conventional router device or machine having a plunger type cutter.

A work piece can be clamped by way of a clamping link 50, which is slidably moveable by way of a clamping screw spindle 52 having an operable handle 54. The spindle 52 is operatively attached to the clamping plate 26.

The jig 10 is mountable by way of a mounting bracket 56 to a workbench or other type of support.

A guide arm 58 is fixed to the bar 48.2 and carries a rotatable guide wheel 60 adapted to run along the tenon profile template 62 mounted on the template support plate 64 for guiding the router when mounted on the plate 48 for cutting a tenon in a work piece. The template support plate 64 is attached to the fixable clamping plate 24.

The longitudinal guide rails 12, 14 provide guidance along the x-axis, whereas the transverse guide rails 16, 18 provide guidance along the y-axis.

A conventional router device or machine (not shown) is attachable to the plate 48 so that its cutter projects through the hole 66 provided in the plate 48.

Figure 4:
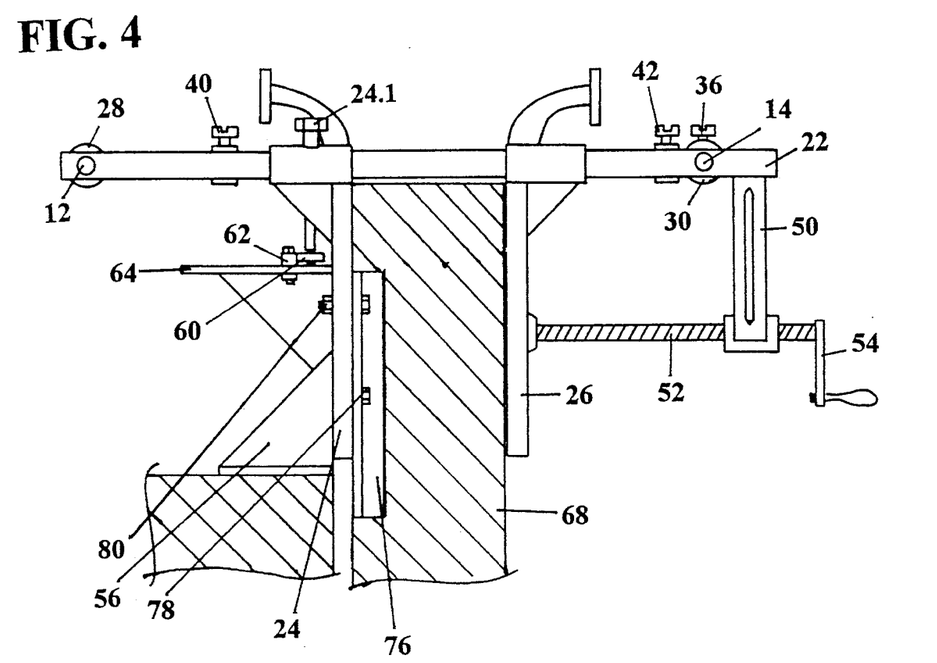
FIG. 4 an end view of the work piece clamping parts seen along arrow IV in FIG. 1.
Figure 5:
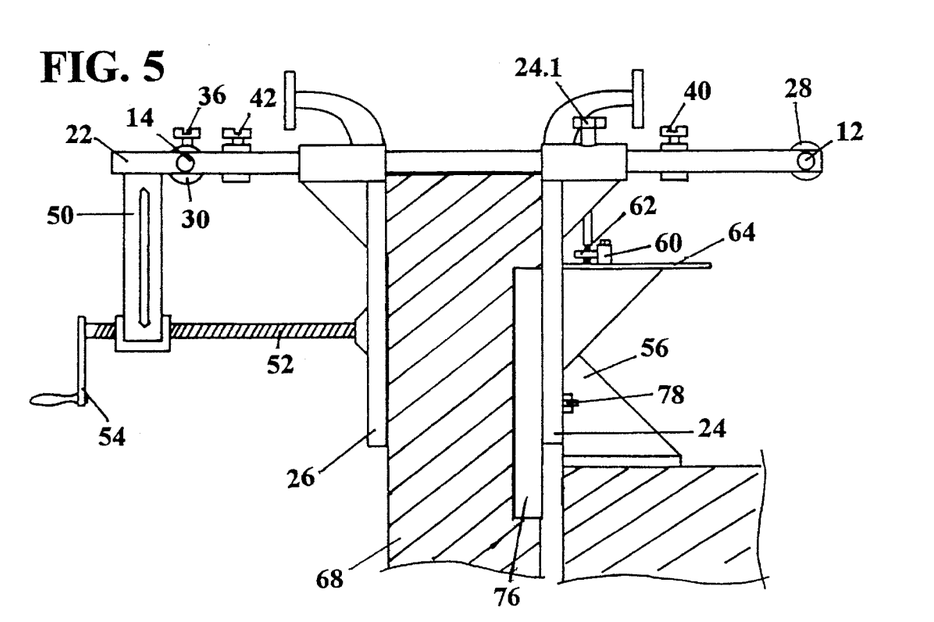
FIG. 5 an opposite end view of the work piece clamping parts seen along arrow V in FIG. 3.

A wooden work piece 68 is clamped between the movable plate 26, attached to the spindle 52 and the lockable plate 24 in the position as shown in FIGS. 4 and 5 and as will be described hereinafter.

Figure 6:
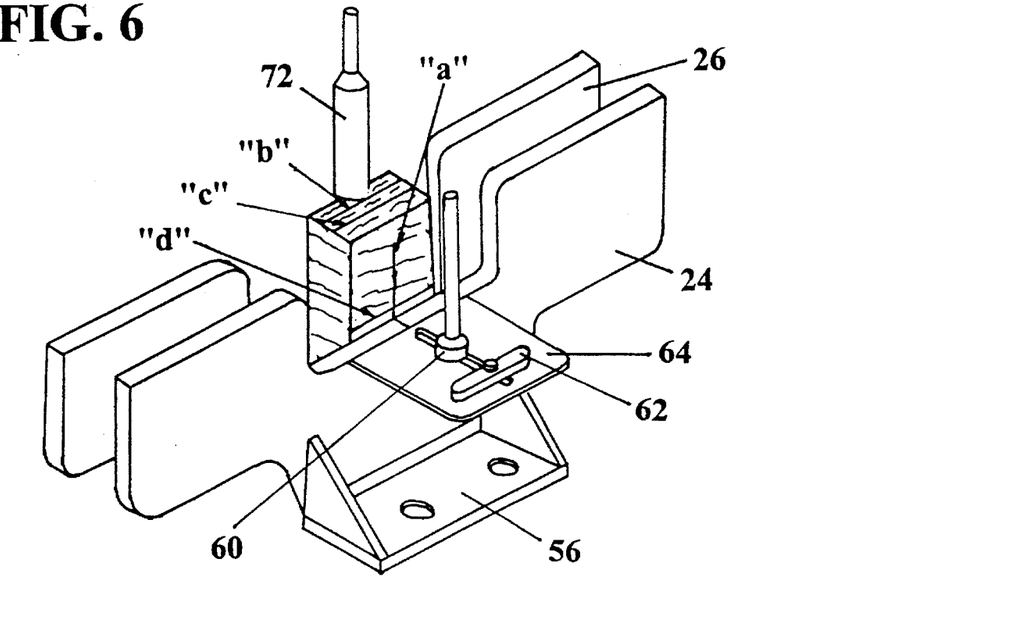
FIG. 6 a perspective view of the work piece clamping parts for setting up and cutting a standard type of tenon.
Figure 11:
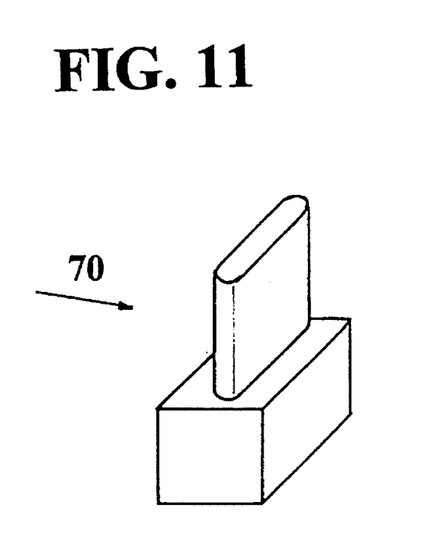
FIG. 11 a perspective view of a standard type of tenon.

Referring to FIG. 6, for cutting a standard type of tenon 70 (see FIG. 11) the following procedure is followed:

The centre of the tenon is marked on the face of the work piece 68 (line "a"). Similarly the outline (width) of the tenon is marked on the end of the work piece 68 (lines "b" and "c"). The tenon profile template 62 can be used for this purpose.

The depth of the tenon is marked (line "d") and the work piece 68 is clamped into position between the clamping plates 24, 26 with the marked line corresponding to a locating notch on the fixed clamping plate 24.

It is to be ensured that the work piece 68 is perpendicular and just clear of the router plate 48.

The locking collars 36, 38 and 40, 42 are located at the end of the respective guide bars 14 and 16. This will ensure free travel of the router carriage assembly in the horizontal x-y plane in all directions. The tenon cutting bit 72 is positioned as shown in FIG. 6 (i.e. along line "b").

The appropriate tenon profile template 62 is located to fit slightly against the guide wheel 60, ensuring that the tenon profile template 62 is parallel to the x-axis of the work piece 68. Lines are suitably edged on the template support plate 64 to assist in doing this.

The tenon profile template 62 is now firmly secured to the template support plate 64. The depth of the cut using line "d" as reference is set and the router is started.

The cut is completed whilst maintaining contact between the guide wheel 60 and the entire circumference of the tenon profile template 62.

Figure 8:
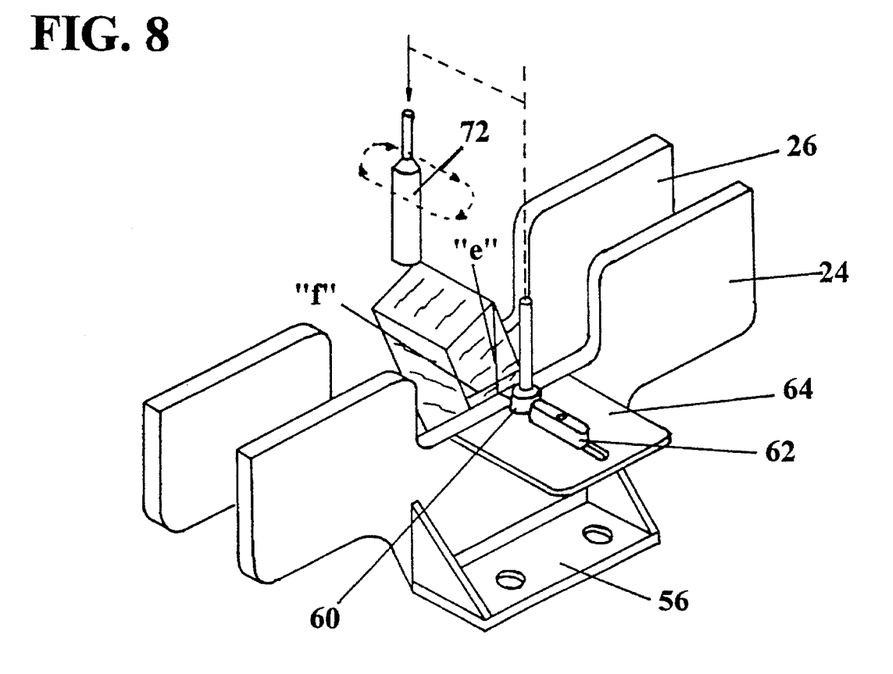
FIG. 8 a perspective view of the work piece clamping part for setting up and cutting an angled tenon.
Figure 9:
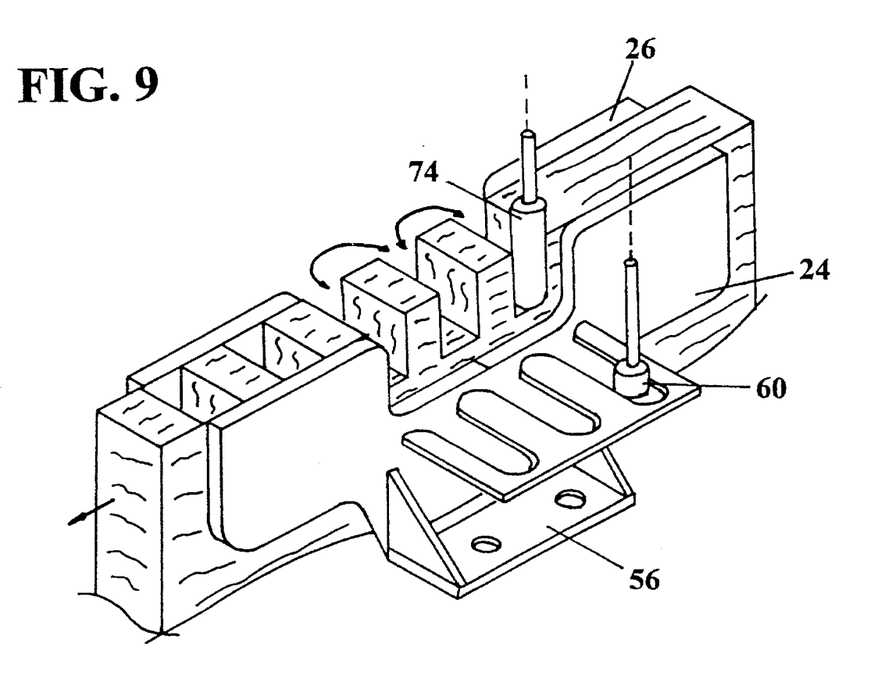
FIG. 9 a perspective view of the work piece clamping parts for setting up and cutting a number of slotted ends.
Figure 12:
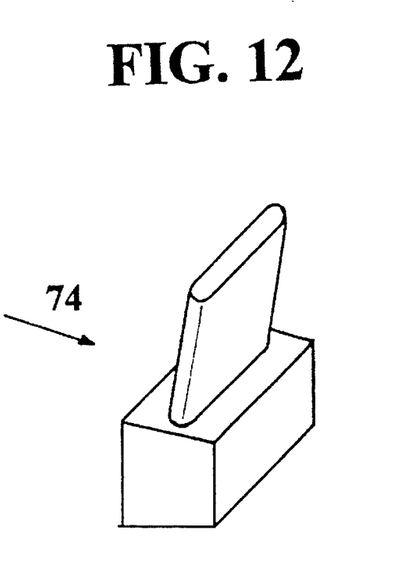
FIG. 12 a perspective view of an angled tenon.

For setting up and cutting an angled tenon 74 (see FIG. 12) the following procedure is followed (with reference to FIG. 8):

The work piece 68 and tenon profile template 62 are rotated through 90° and cutting of the tenon proceeds parallel to the y-axis.

The edge of the work piece is marked at the required angle (line "e"). Similarly line "f" marks the depth of the cut. Lines "e" and "f" intersect at the centre of the work piece 68 as shown.

Alignment and positioning of tenon profile template 62 as well as the cutting of the tenon proceeds as described above.

Figure 1:
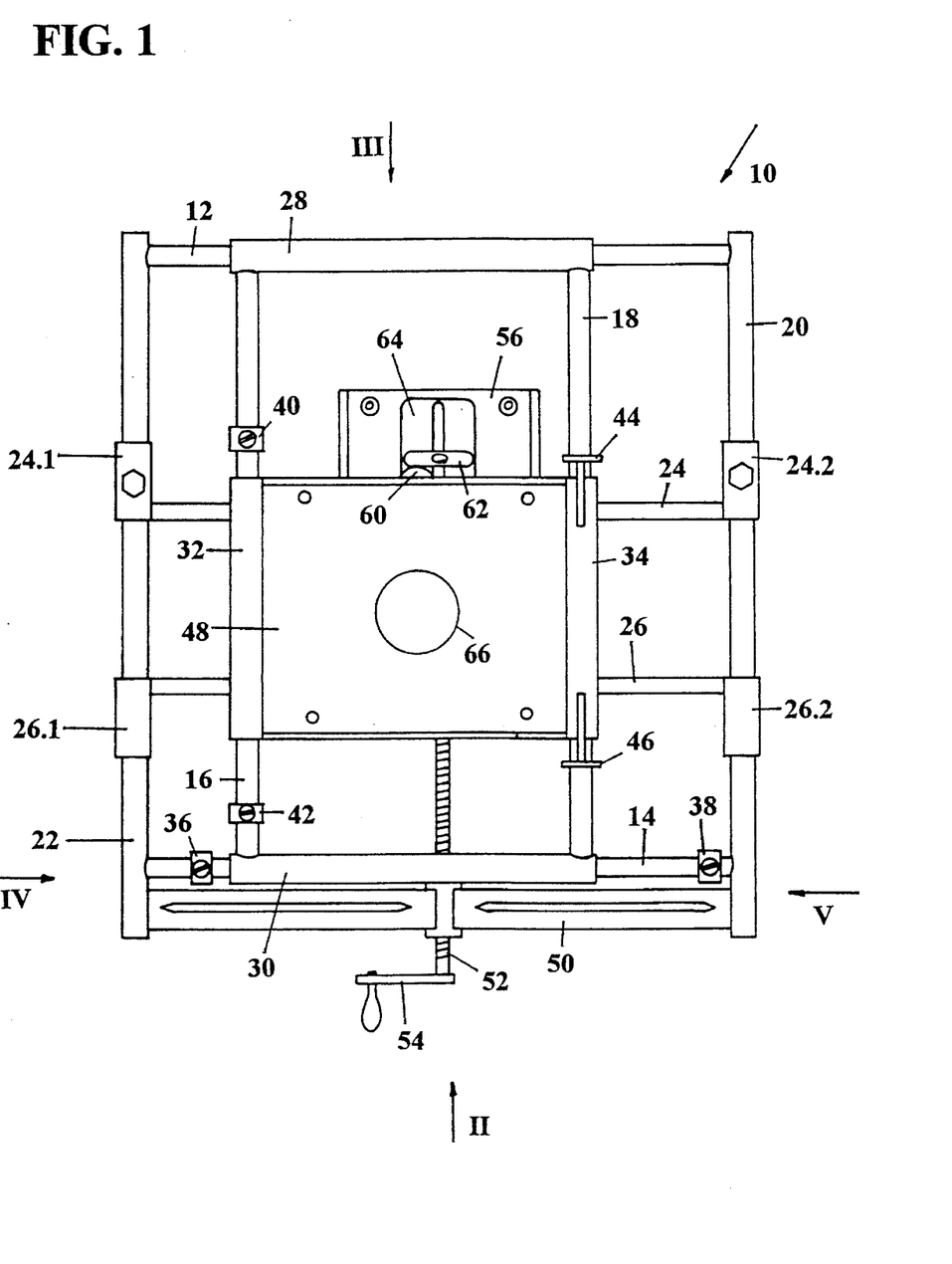
FIG. 1 a plan view of the mortise and tenon jig in accordance with the invention.
Figure 2:
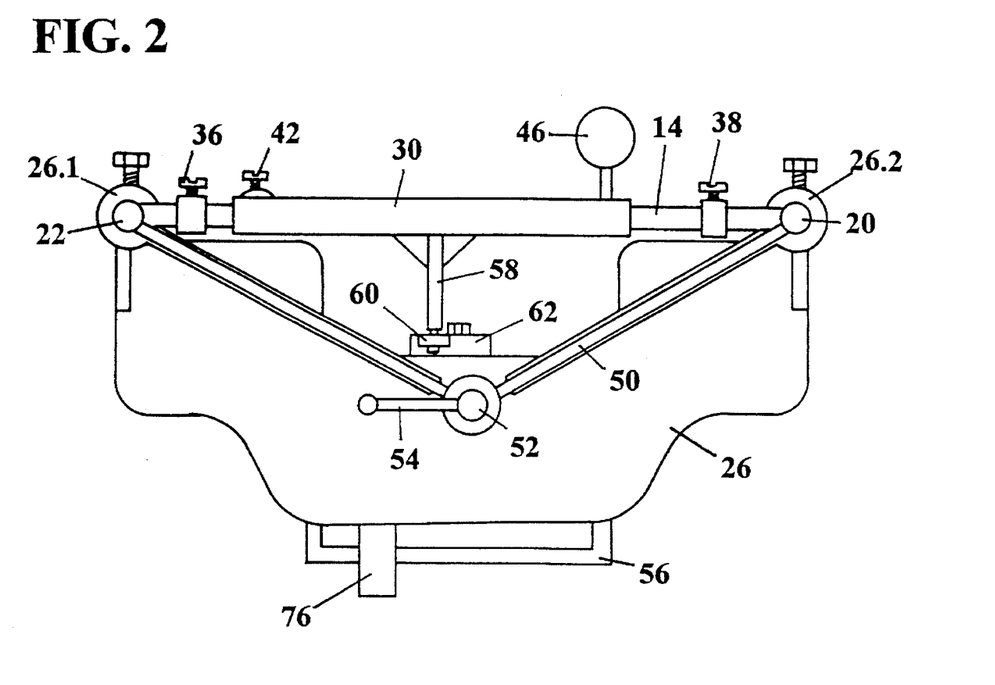
FIG. 2 a side view seen along arrow II in FIG. 1.
Figure 3:
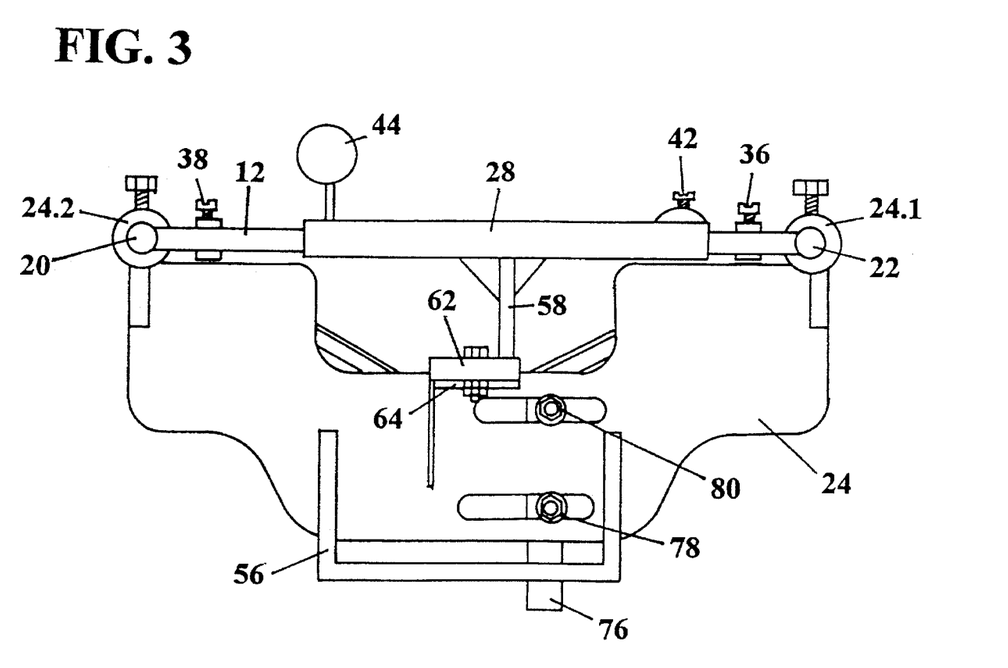
FIG. 3 an opposite side view seen along arrow III in FIG. 1.

If a number of similar tenons are to be cut, the positioning plate 76 (FIG. 3) is used to locate subsequent work pieces precisely and at the same height. The positioning plate 76 is clamped snugly against the work piece 68 to ensure accurate relocation of work pieces of similar dimension. The plate 76 is adjustably attached by means of threaded bolts and nuts 78, 80 to the fixed clamping plate 72.

Figure 7:
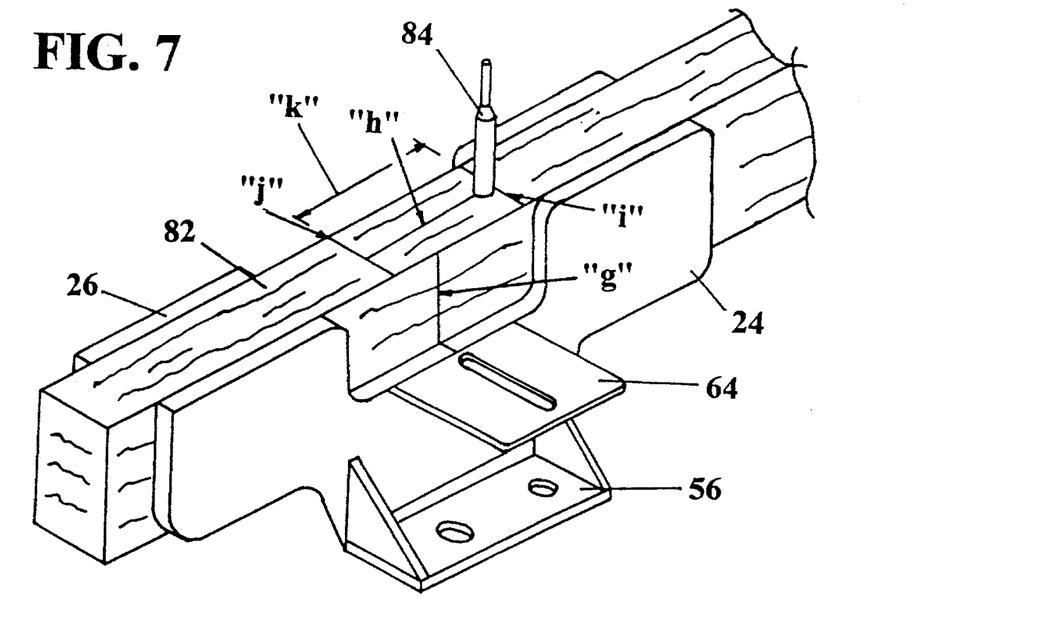
FIG. 7 a perspective view of the work piece clamping parts for setting up and cutting a standard type of mortise.

To set up and cut a mortise the following procedure is followed:

With reference to FIG. 7, the centre of the intended mortise is marked on the face of the work piece 82 (line "g"). Similarly the centre of the intended cut along the edge of the work piece 82 (line "h") is marked. Lines "i" and "j" indicate the limits of the intended cut. Thus the length "k" will correspond to the length of the tenon profile template 62 used to cut the matching tenon joint.

The bit 84 used to cut the mortise will also correspond to the width of the matching tenon joint and tenon profile template 62.

The work piece 82 is clamped between the clamping plates 24, 26 with line "g" corresponding to the locating notch on the fixed clamping plate 24. The work piece 82 must be parallel to the router carriage assembly, i.e. the plate 48.

With the mortise cutting bit 84 positioned over the centre of the intended cut, the collars 40, 42 are locked snugly against the router carriage assembly sliding tube 32. This will ensure that no movement can occur transversely across the work piece 82 in the y-plane.

Next the mortise cutting bit 84 is positioned at the one end of the intended cut and the collar 36 is locked. The router carriage plate 48 is slid in the x-direction until the mortise cutting bit 84 is up against "j", and then the collar 38 is locked. The travel of sliding tubes 28, 30 will thus be limited between the collars 36, 38 and be of the same length as the intended cut.

The router is now started and whilst holding the tube 30 snugly against the stop collar 36 or 38 the router is introduced to the required depth and locked. The cut is completed by moving the router until the tube 30 abuts against the other stop collar 36 or 38.

The device 10 is intended to cooperate with standard router bits, but the cutting of the mortise, especially the deep mortise, will be greatly facilitated by the use of a fluted router bit.

The width of the mortise joint is entirely dependant on the router cutter bit diameter. Any commercially available router bit may be used. For metric timber sides the smallest bit required will probably be 8 mm and the largest approximately 20 mm.

The width of the tenon joint, and indeed its overall dimensions, will correspond to that of the tenon profile template 62, provided the diameter of the router cutter 72 and that of the guide wheel 60 are the same.

The tenon profile template 62 used to cut a tenon is of the same width as the matching mortise. If standard bits are used to cut the mortise, i.e. 8, 10, 12 mm etc., the tenon profile template 62 can be made of standard stock square bar of mild steel, brass aluminium or any other suitable material.

Figure 13:
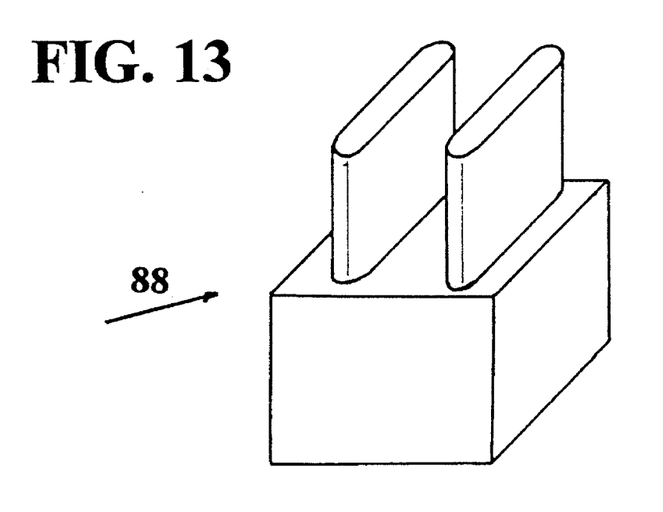
FIG. 13 a perspective view of a double tenon.

To cut a double tenon 88 (see FIG. 13) two tenon profile templates 62 of similar dimensions are required. They are positioned on the template support plate 64 parallel to the y-axis and the spacing between them is selected to suit the size of timber to be machined.

The jig 10 in accordance with the invention therefore can be used for the following operations:

1. Cutting of radiused mortise and matching tenon joints.
2. Cutting of double mortise and matching tenon joints.

3. Cutting of angled tenon joints.
4. Cutting of slotted end joints (lap joints).

The jig 10 preferably is attached to a support structure, such as a table, as described above, or it can be mounted directly on a work piece.

I claim:

1. A mortise and tenon jig for a router device includes
   a) a base structure;
   b) a mounting member joined to the base structure, and being attachable to a support structure such as a table;
   c) first spaced apart parallel elongated guiding members attached to the base structure;
   d) second spaced apart parallel elongated guiding members;
   e) a router support member for operatively supporting a router device;
   f) first sliding members attached at opposite ends of the second guiding members for slidingly supporting these relative to the first guiding members;
   g) second sliding members slidingly mounted on the second guiding members;
   h) an attachment member for attaching the router support member to the second sliding members;
   i) a first work piece clamping plate slidably joined to the base structure;
   j) a second work piece clamping plate slidably joined to the base structure;
   k) moving means for moving the second work piece clamping plate relative to the first work piece clamping plate for clamping a work piece between them;
   l) first stop means for limiting movement of the first sliding members on the first guiding members;
   m) second stop means for limiting movement of the second sliding members on the second guiding members;
   n) a tenon template support member connected to the second sliding members; and
   o) a template guide member for moving along a tenon profile template joined to the template support member.

2. A jig as claimed in claim 1, in which the first guiding members are constituted by a pair of rods.

3. A jig as claimed in claim 1, in which the second guiding members are constituted by a pair of rods.

4. A jig as claimed in claim 1, in which the router support member includes a plate having a hole for a router's cutter to pass through and being supported by bars joined to the second sliding members.

5. A jig as claimed in claim 1, in which the tenon template support member has adjusting means for adjustably attaching a tenon profile template to it.

* * * * *